May 20, 1924.
A. F. JENKINS
WELDING AND CUTTING TORCH
Original Filed Jan. 5, 1920  2 Sheets-Sheet 1
1,494,747
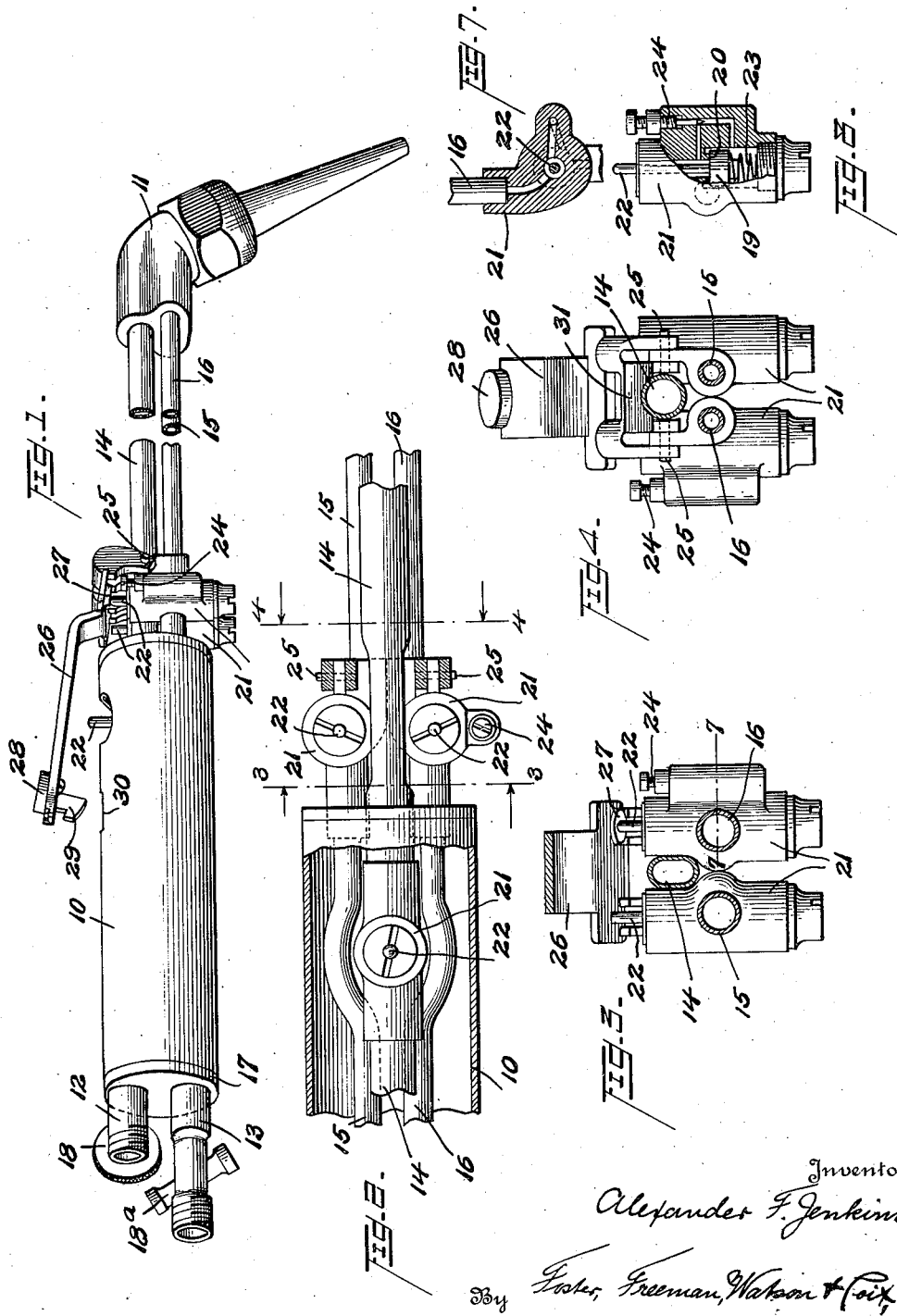

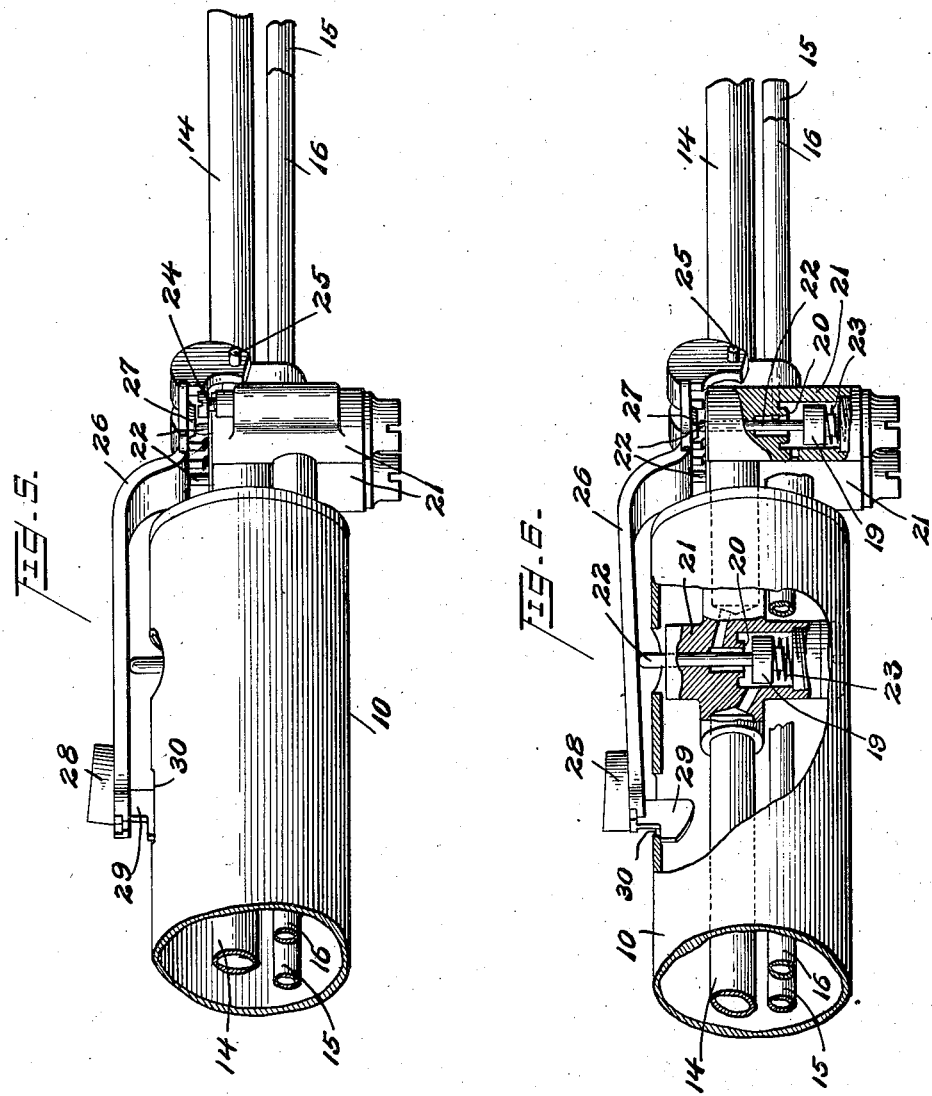

Patented May 20, 1924.

1,494,747

UNITED STATES PATENT OFFICE.

ALEXANDER F. JENKINS, OF BALTIMORE, MARYLAND.

WELDING AND CUTTING TORCH.

Application filed January 5, 1920, Serial No. 349,365. Renewed April 3, 1924.

*To all whom it may concern:*

Be it known that I, ALEXANDER F. JENKINS, a citizen of the United States, and residing at Baltimore city, State of Maryland, have invented certain new and useful Improvements in Welding and Cutting Torches, of which the following is a specification.

The object of this invention is to provide an improved valve controlling means for welding and cutting torches, particularly oxy-acetylene torches, whereby greater convenience to the operator and greater economy in the uses of the gas supplied are realized. In the operation of cutting metals with a torch of this character it is necessary to first preheat a portion of the same before applying the cutting oxygen flame, and the valves controlling the gases flowing to the heating jet are opened before the valve controlling the flow to the cutting jet. It is usual also to open the valve of the acetylene conduit before the valve of the heating oxygen conduit in lighting the torch, inasmuch as when both are opened simultaneously the oxygen jet will usually blow out the lighting flame as the oxygen is under high pressure. In torches of this class having pilot lights it is necessary to turn on the acetylene or other combustible gas first the pilot light being usually immediately extinguished when the heating oxygen and acetylene for the heating jet are simultaneously turned on.

My invention contemplates the use with a torch either having or lacking a pilot light, of a member conveniently operable by pressure of the hand to open the valves in the desired order, the acetylene gas controlling valve first, the heating oxygen controlling valve second, and the cutting oxygen controlling valve last. The various valves are allowed to close in the reverse order of their opening by suitable springs when the member is released, and all three valves may be held open indefinitely, if desired, by latching the valve operating member. Also in the operation of the device the acetylene valve may be opened and held open any length of time without opening the heating oxygen valve or the acetylene and heating oxygen valves may be both opened and held open indefinitely without opening the cutting oxygen valve.

I describe below and illustrate in the accompanying drawings by way of example, one embodiment of the invention, incorporated with a torch having a pilot light, the latter being especially useful in connection with my improved valve operating means.

In the drawings, Figure 1 is a perspective view of a cutting and welding torch having my improved valve operating mechanism incorporated therewith;

Figure 2 is a top view of a portion of the same, parts being broken away to show the positions of the valves;

Figure 3 is a section along the line 3—3 of Figure 2;

Figure 4 is a section on the line 4—4 of Figure 2;

Figure 5 is a perspective view of a central portion of the torch showing the valve operating member in a different position;

Figure 6 is a similar view showing the valve operating member in a third position, the casings of several of the valves being broken away to show the interior;

Figure 7 is a section along the line 7—7 of Figure 3;

Figure 8 is a front view of the valve casing shown in section in Figure 7, part being broken away to show the valve and the pilot light gas ducts.

I shall describe the invention in connection with a cutting and welding torch to which it is particularly applicable, but it may be used in connection with a torch designed only for welding if desired. Furthermore, the torch illustrated and described has a pilot light, as I have found the invention also particularly useful in connection with torches having this device, but it will be understood that a pilot light is not an essential feature of the invention.

The torch has the usual handle portion 10, head 11 having conduits therein for cutting oxygen, oxygen to be supplied to the heating flame, and acetylene gas, these conduits communicating with the passages in the tip in the usual manner, and with supply conduits 12 and 13 for oxygen and acetylene respectively, by means of pipes or conduits, 14, 15, 16 respectively, which extend from the head 11 through the handle, and connect with the block 17 at the rear thereof at which point the oxygen conduit 12 is divided and communicates with each of the pipes 14 and 15. The usual hand valves 18 and 18ª control the flow of gas from the source of oxygen and acetylene supply respectively, and between the block 17 and the head are located additional controlling valves which are adapted to be more quickly and conveniently operated by the user of the torch.

These valves are substantially similar in construction, each comprising a valve proper indicated at 19, a valve seat indicated at 20 in the valve casing 21, a valve spindle 22 axially aligned with the valve and extending without the valve casing, and a spring 23 which normally holds the valve seated to interrupt the flow of gas from the handle to the head and tip of the torch. The valve casing which contains the acetylene controlling valve has however a by-pass around the valve proper, as is shown clearly in Figures 7 and 8, and this by-pass permits the constant flow of acetylene to a small extent for the purpose of supplying a pilot light at the tip. A needle valve 24 regulates exactly the amount of gas flowing to the pilot light.

Pivotally attached at 25, 25 to the heating oxygen and acetylene valve casings respectively is a member or lever 26 which extends rearwardly over each of the three valve stems 22. By arranging the tops of the valve stems in different planes or by providing suitable bosses or projections such as shown at 27, in the drawings, the member 26 is caused to open the valves against the pressures of their various springs, in succession, as its free end is pressed by the hand of the operator toward the body of the handle. In Figure 1 the member is shown in its uppermost or normal position, the spring pressing the acetylene valve upwardly being sufficiently strong to maintain it in this position at all times when no pressure is brought to bear thereon. In this position the boss 27 is resting upon the upper end of the valve stem connected to the acetylene controlling valve, but the lever is not in contact with the heating oxygen controlling valve or the cutting oxygen controlling valve.

As the free end of the member 26 is moved toward the handle it will be seen that the acetylene controlling valve will be opened before the lever comes in contact with the heating oxygen controlling valve and that both of these valves will be opened before this member or lever comes in contact with the valve stem of the cutting oxygen controlling valve. In Figure 5 the member 26 is shown in position to hold the heating oxygen valve and the acetylene controlling valve both open while the cutting oxygen valve is closed. In Figure 6 the lever 26 is shown in position to hold all of the valves 19 open, the torch being in this case ready to be used for cutting purposes. In this last position the thumb piece 28 is moved to bring the latch 29 under the edge of the aperture 30 in the handle through which it projects, and the lever is thus locked in this position until the thumb piece is moved to disengage the latch.

To prevent the lever 26 from rotating forwardly about the pivots 15 to assume a position in which it would make a large angle with the handle and might easily be broken off, it is provided at its forward end with a cross piece 31, adapted to contact with the pipe 14 which serves as a stop, for this purpose.

From the foregoing description the advantages of the invention will be apparent. In both cutting and welding operations the operator by a slight pressure of the hand is enabled to effect the successive opening of the valves in proper order and, by simply releasing the lever, can allow them to close. This insures that the lighting flame, whether it be a pilot light or other flame, will not be blown out before the heating jet is ignited and also enables the operator to have perfect control over the flame when he has one hand occupied, as when holding the work. Torches having my valve controlling means incorporated therewith are also economical in the use of gas, inasmuch as the valves will close as soon as the lever is released, as when the torch is laid down, and no flow of gas continue after the same has been taken from the work.

A feature of the invention which renders it especially useful in cutting operations is that the top of the valve stem 22 of the cutting oxygen valve constitutes an abutment which yieldingly limits the downward movement of the lever 26 as shown in Figure 5 and thus enables the operator to hold the valves of the heating gas conduits open while the cutting oxygen is cut off. It will be noted that the cutting oxygen valve is much farther from the fulcrum 25 of the lever and that it therefore is much more effective as a stop. The lever may be held indefinitely in the position shown in Figure 5 for heating the work, and for cutting it is only necessary to increase the pressure of the hand sufficiently to move downwardly the valve stem or yielding abutment to start the flow of cutting oxygen. It will be understood that another form of yielding abutment independent of the oxygen valves may be used for this purpose and other changes in details may be made within the spirit and scope of the invention.

Having thus described the invention what is claimed as new and desired to be secured by Letters Patent is:

1. A torch of the class described, comprising in combination, a conduit for a combustible gas, a conduit for combustion supporting gas, and a conduit for cutting oxygen, a valve in each of said conduits controlling the flow of gas therethrough, and means including a manually operable member secured to the torch, for successively opening the valves, the valve controlling the combustible gas being the first to be opened and the cutting oxygen valve being the last to be opened.

2. A torch of the class described, comprising in combination, a conduit for a combustible gas, a conduit for a combustion supporting gas, and a conduit for cutting oxygen, a valve in each of said conduits for controlling the flow of gas therethrough, a manually operable member secured to the torch for successively opening the valves, and a yielding abutment for said member adapted to indicate the position at which the member begins to open the cutting oxygen valve.

3. A torch of the class described comprising in combination, a conduit for combustible gas, a conduit for combustion supporting gas and a conduit for cutting oxygen, valves in said conduits adapted to normally close the same, a manually operable member common to said valves and adapted to open the same in the order mentioned, the valve for cutting oxygen having a spring operated valve stem adapted to form a yielding stop for said member to indicate to the operator the point at which the cutting oxygen valve begins to open, for the purpose set forth.

4. A torch of the class described comprising in combination, a conduit for a combustible gas, a conduit for a combustion supporting gas, and a conduit for cutting oxygen, a valve casing intermediate the ends of each conduit, a valve in each valve casing for controlling the flow of gas therethrough, a valve stem attached to each of said valves and extending without the valve casing, a lever pivotally secured to the torch and adapted to be manually operated to successively open the valves, and spring means for returning the valves to their seats and raising the lever, when the latter is released, the valve controlling the combustible mixture being the first to be opened and the last to close and the cutting oxygen valve being the last to be opened and the first to close.

5. A torch of the class described, comprising in combination, a conduit for a combustion supporting gas, a conduit for a combustible gas, and a conduit for cutting oxygen, a valve casing intermediate the ends of each conduit, a valve in each valve casing for controlling the flow of gas therethrough, each valve having a valve stem extending through the casing whereby it may be operated, a spring for each valve and normally holding it seated, and a lever pivotally secured to the torch and adapted to be manually operated to successively bear on the valve stems to open the valves, the cutting oxygen valve stem being farthest from the fulcrum of the lever and constituting a yielding stop for said lever, for the purpose set forth.

6. A torch of the class described, comprising in combination, a conduit for a combustible gas, a conduit for combustion supporting gas, and a conduit for cutting oxygen, means for controlling the flow of gas through said conduits, and a manually operable member for operating said control means, said member acting on said means to cause successive opening of the conduits, the combustible gas conduit being the first to be opened and the cutting oxygen conduit being the last to be opened.

7. A torch of the class described, comprising in combination, a conduit for a combustible gas, a conduit for a combustion supporting gas, and a conduit for cutting oxygen, and movable means for controlling the flow of gas through said conduits, said means causing successive opening of the conduits when manipulated, the combustible gas conduit being the first to be opened and the cutting oxygen conduit being the last to be opened.

In testimony thereof I affix my signature.

ALEXANDER F. JENKINS.